(12) United States Patent
Mollmann et al.

(10) Patent No.: US 6,983,199 B2
(45) Date of Patent: Jan. 3, 2006

(54) VIBRATION MEASUREMENT AND RECORDING SYSTEM AND METHOD

(75) Inventors: Daniel E. Mollmann, Cincinnati, OH (US); Gert ven der Merwe, Monroe, OH (US); Lawrence J. Bach, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 10/426,747

(22) Filed: Apr. 30, 2003

(65) Prior Publication Data

US 2004/0220710 A1 Nov. 4, 2004

(51) Int. Cl.
*G06F 7/00* (2006.01)
(52) U.S. Cl. ...................................................... 701/29
(58) Field of Classification Search ................ 701/29, 701/30, 35; 702/56
See application file for complete search history.

(56) References Cited

U.S. PATENT DOCUMENTS

| 6,098,022 A | * | 8/2000 | Sonnichsen et al. ......... 702/35 |
| 6,445,995 B1 | | 9/2002 | Mollmann |
| 6,491,497 B1 | | 12/2002 | Allmon et al. |

* cited by examiner

*Primary Examiner*—Yonel Beaulieu
(74) *Attorney, Agent, or Firm*—Andrew Hess; Barbara Joan Haushalter

(57) ABSTRACT

A system and method are provided for allowing simplified access to the raw vibration data. The signal conditioner, even if mounted on the engine or the engine pylon, digitizes the input signals and can analyze and store a finite amount of raw data. The raw signals are digitized at a high rate of speed, and the digitized values are stored. The stored values can be retrieved after flight. This aircraft vibration processor and recording system allows easy access to the raw vibration waveform, even in configurations where the processor is located on the engine or the engine pylon.

20 Claims, 2 Drawing Sheets

VIBRATION MEASUREMENT AND RECORDING SYSTEM AND METHOD

BACKGROUND OF THE INVENTION

The present invention relates to vibration monitoring for aircraft engines and, more particularly, to a computer-based system for accessing a raw vibration signal from the aircraft engine.

Typical commercial aircraft engines have accelerometers and an associated signal conditioning system to monitor engine health and provide an indication of vibration to the flight crew. Most current aircraft vibration monitoring systems have the vibration monitoring computer located in the electronics bay in the body of the aircraft, and the accelerometers located on the engine. Initial signal conditioning units, such as amplifiers, may be located on the engine, in the strut, or in the aircraft electronics bay. The vibration monitoring computer, which is a signal processing unit that performs functions such as filtering the signals to determine the synchronous vibration, are typically located in the aircraft electronics bay. The output of this signal processor is a greatly simplified representation of the original signal. A typical output would only be the 1/rev vibration amplitude for each of the engine rotors, for example the 1/rev LP (low pressure) and HP (high pressure) values reported once per second. The much more complicated original vibration signal would contain this information, as well as responses at many other frequencies, such as harmonics of the 1/rev, rotor blade passing frequencies, and rolling element bearing passing frequencies.

On some engine and aircraft systems, however, this signal processor is located on the engine or the engine pylon. The advantage to mounting the vibration monitoring computer on the engine or pylon compared to the aircraft electronics bay is that the system is typically lighter in weight and the vibration signals are subject to less noise. However, if a vibration problem arises where access to the raw vibration signal is needed in order to do a proper diagnosis of the cause, some action would be required, such as running a wire from the signal processing computer on the engine, through the wing to the cabin of the aircraft, to allow access to the raw data. Thus, when the vibration monitoring computer is located on the engine, it can be difficult, if not outright impossible, to access the raw waveform data for troubleshooting.

It would be desirable to provide access the raw vibration signal from a vibration monitoring computer, particularly when the vibration monitoring computer is mounted on or near the engine, without the need for extraordinary measures as currently required by the existing art.

BRIEF DESCRIPTION OF THE INVENTION

A system and method are proposed for using the vibration monitoring computer for data storage. This improved aircraft vibration processor and recording system allows easy access to the raw vibration waveform, even in configurations where the processor is located on the engine or the engine pylon. Difficult access to the raw vibration signal is eliminated with the present invention.

Accordingly, the present invention provides a system and method for allowing simplified access to the raw vibration data. The signal conditioner, even if mounted on the engine or the engine pylon, digitizes the input signals and can analyze and store a finite amount of raw data. The raw signals are digitized at a high rate of speed, and the digitized values are stored. The stored values can be retrieved after flight.

DETAILED DESCRIPTION OF THE INVENTION

Figure 1:
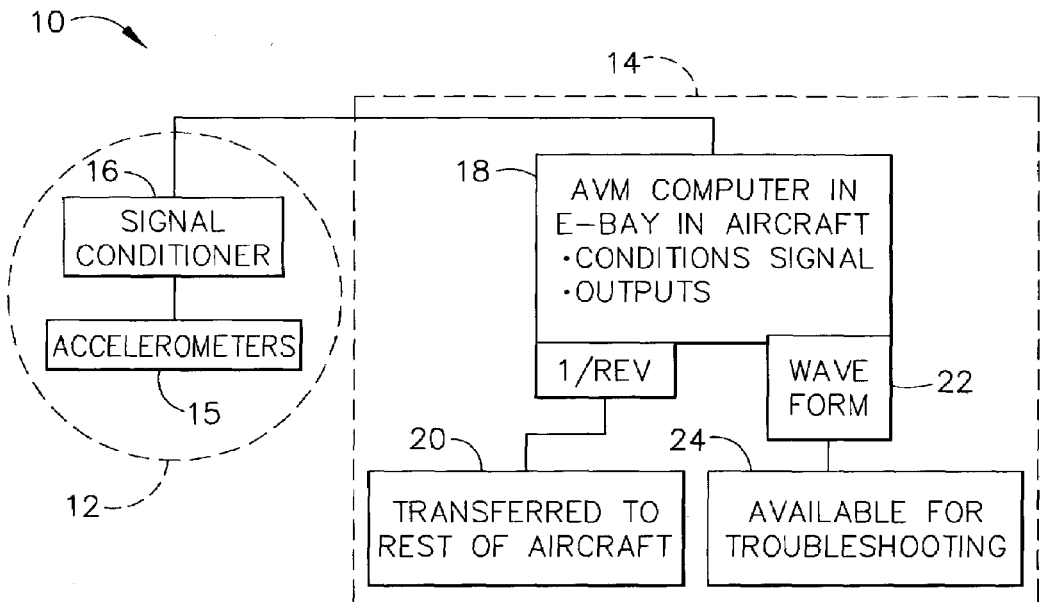
FIG. 1 is a block diagram illustration of a prior art vibration measurement and recording system with the vibration monitoring computer located in the aircraft body.

Referring to FIG. 1, there is illustrated a block diagram of the configuration of a prior art system 10 for measuring and recording vibration in an aircraft engine. FIG. 1 shows the configuration wherein the signal conditioner 16 is mounted on the engine 12. The vibration monitoring computer 18 is located in the electronics bay of the aircraft 14. The typical output of the vibration monitoring computer 18 is a 1/rev value, reported to the aircraft, as indicated by block 20, at particular time intervals, varying from some number of times per second to once every so many seconds. The original input signal is represented as raw waveform data at block 22. If the raw vibration signal is needed, it can be easily accessed in the electronics bay from the aircraft cabin.

Figure 2:
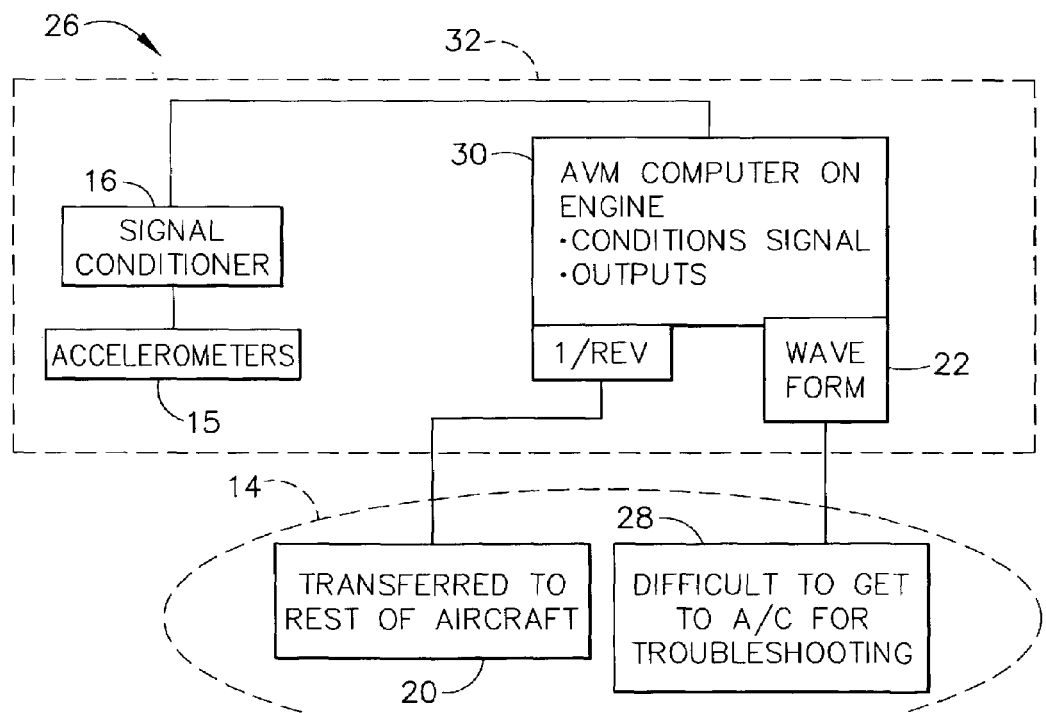
FIG. 2 is a block diagram of a prior art vibration measurement and recording system with the vibration monitoring computer located on the engine.

Recent prior art systems have moved this vibration monitoring computer from the aircraft electronics bay to the engine, as is illustrated in FIG. 2. This allows a generally lighter weight system and one which is less susceptible to electrical noise and false signals. However, the disadvantage of such a configuration is that access to the raw vibration signal for troubleshooting is difficult or impossible.

Figure 3:
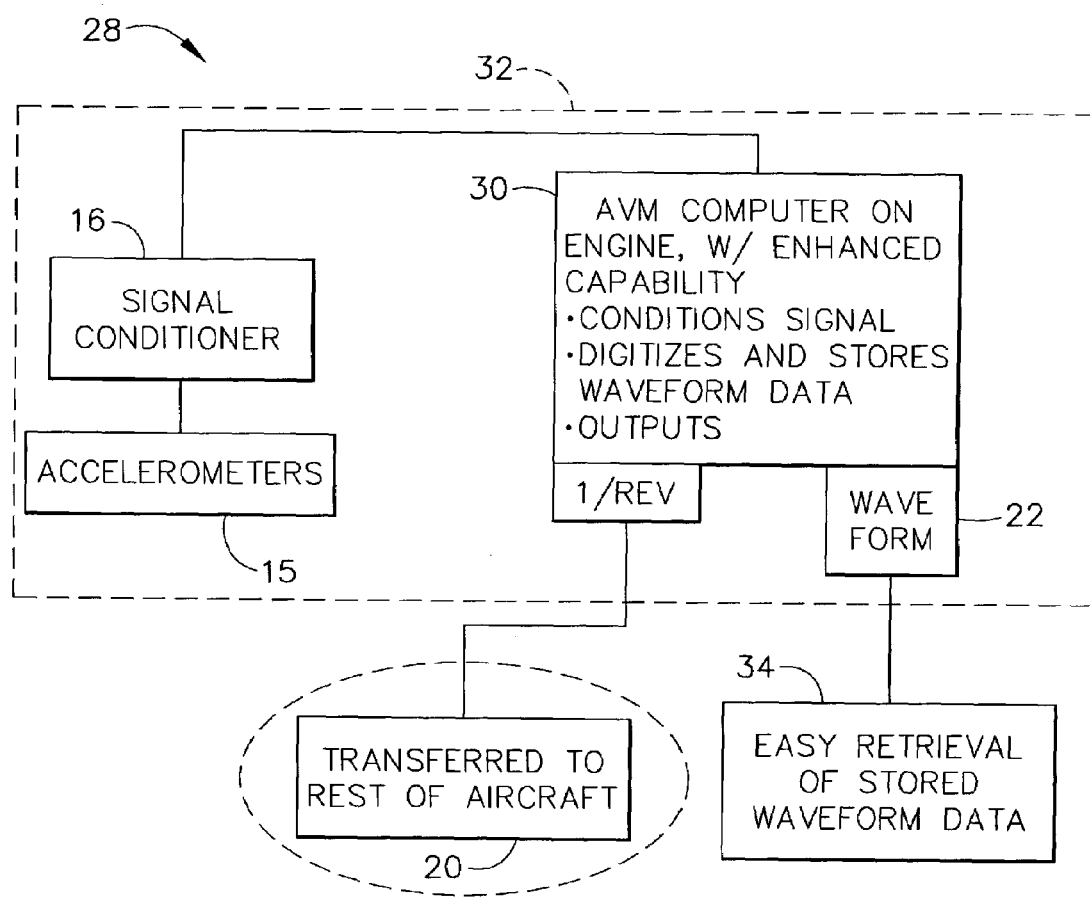
FIG. 3 is a block diagram of a vibration measurement and recording system configured in accordance with the present invention.

Continuing with FIGS. 1 and 2, and referring also to FIG. 3, the present invention proposes a novel configuration 28 for measuring and recording vibration in an aircraft engine. In some configurations, such as that illustrated in FIGS. 2 and 3, the vibration monitoring computer 30 is installed on the engine, as indicated by block 32 in FIG. 2. It will be obvious to those skilled in the art that the present invention is also applicable to configurations where the vibration monitoring computer is mounted on the engine pylon, without departing from the scope of the invention. The configuration shown in FIG. 3 provides a novel solution to the existing problem of raw data access for configurations such as that shown in FIG. 2.

In accordance with the present invention, then, the vibration monitoring computer 30 has expanded capabilities, eliminating the need for extraordinary measures to access the raw vibration signal. The prior art vibration monitoring computer, or signal conditioner, 30 digitizes the input signals and has capabilities to analyze and store a finite amount of data. The system of the present invention capitalizes on this existing capability and increases the storage capacity of the computer. The storage capacity can be increased by any suitable means, such as by adding a chip in the computer that is capable of providing expanded memory. The raw signals can be digitized at a rate of speed fast enough to capture the essence of the analog waveform, for example, 500 to 5000 samples per second, and these digitized values can be stored. A commercially available chip or other suitable device, such as a digital converter, can be used to digitize the signals for storage in the computer. Software in the computer can be set to start the capture of the raw vibration waveform under certain conditions. For example, the data capture can occur at a specified time, at a specified engine rotor speed, in the event of a specific occurrence such as if a threshold vibration amplitude is reached, or by input command from the aircraft.

The expanded capabilities of the computer allow the digitized raw data to be stored and to then be retrieved after flight. This is essentially equivalent to having access to the original raw signals, since digitizing the analog signals at a high rate of speed provides as much information as the original analog signal. When the information can not be retrieved, as a practical matter, during flight, the information can be retrieved after flight without any loss of data. This eliminates the problem of difficult access to the raw vibration signal, such as when the vibration monitoring computer is mounted in the engine.

The technique of the present invention can also be used to capture raw vibration signals during events that occur in revenue service, triggered by high vibration, engine stall, engine failure, pilot input, or another parameter. The capability to access raw vibration data in revenue service, without any special equipment, does not exist with current systems. This ability can be especially advantageous for aid in diagnosing problems and field events.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for allowing simplified access to raw vibration data collected by a vibration monitoring computer associated with an aircraft engine, when the vibration monitoring computer is mounted on the engine, comprising:
    means for capturing raw vibration waveforms;
    means for digitizing the captured raw vibration waveforms to capture analog waveform data;
    means for providing expanded memory for the vibration monitoring computer; and
    means for storing the digitized waveforms for subsequent retrieval.

2. A system as claimed in claim 1 wherein the means for capturing comprises input of analog vibration signals to the vibration monitoring computer.

3. A system as claimed in claim 1 wherein the means for digitizing the captured raw vibration waveforms comprises an analog to digital converter.

4. A system as claimed in claim 1 wherein the means for digitizing the captured raw vibration waveforms to capture analog waveform data further comprises means for digitizing the captured raw vibration waveforms at a speed of at least five hundred samples per second.

5. A system as claimed in claim 1 wherein the means for digitizing the captured raw vibration waveforms to capture analog waveform data further comprises means for digitizing the captured raw vibration waveforms at a speed of approximately five thousand samples per second.

6. A system as claimed in claim 1 wherein the means for providing expanded memory comprises a chip in the vibration monitoring computer.

7. A system as claimed in claim 1 wherein the means for providing expanded memory comprises a storage disk in the vibration monitoring computer.

8. A system as claimed in claim 1 wherein the means for storing the digitized waveforms comprises a storage chip associated with the vibration monitoring computer.

9. A system for allowing simplified access to raw vibration data collected by a vibration monitoring computer associated with an aircraft engine, when the vibration monitoring computer is mounted from the engine pylon, comprising:
    means for capturing raw vibration waveforms;
    means for digitizing the captured raw vibration waveforms to capture analog waveform data;
    means for providing expanded memory for the vibration monitoring computer; and
    means for storing the digitized waveforms for subsequent retrieval.

10. A system as claimed in claim 9 wherein the means for capturing comprises input of analog vibration signals to the vibration monitoring computer.

11. A system as claimed in claim 9 wherein the means for digitizing the captured raw vibration waveforms comprises an analog to digital converter.

12. A system as claimed in claim 9 wherein the means for digitizing the captured raw vibration waveforms to capture analog waveform data further comprises means for digitizing the captured raw vibration waveforms at a speed of at least five hundred samples per second.

13. A system as claimed in claim 9 wherein the means for digitizing the captured raw vibration waveforms to capture analog waveform data further comprises means for digitizing the captured raw vibration waveforms at a speed of approximately five thousand samples per second.

14. A system as claimed in claim 9 wherein the means for providing expanded memory comprises a chip in the vibration monitoring computer.

15. A system as claimed in claim 9 wherein the means for providing expanded memory comprises a storage disk in the vibration monitoring computer.

16. A system as claimed in claim 9 wherein the means for storing the digitized waveforms comprises a storage chip associated with the vibration monitoring computer.

17. A method for allowing simplified access to raw vibration data collected by a vibration monitoring computer associated with an aircraft engine, when the vibration monitoring computer is mounted on the engine or engine pylon, comprising the steps of:
    capturing raw vibration waveforms;
    digitizing the captured raw vibration waveforms to capture essentially analog waveform data;
    providing expanded memory for the vibration monitoring computer; and
    storing the digitized waveforms for subsequent retrieval.

18. A method as claimed in claim 17 wherein the step of digitizing the captured raw vibration waveforms comprises the step of using an analog to digital converter.

19. A method as claimed in claim 17 wherein the step of providing expanded memory comprises the step of providing a storage means in the vibration monitoring computer.

20. A method as claimed in claim 17 wherein the step of storing the digitized waveforms comprises the step of providing a storage disk associated with the vibration monitoring computer.

* * * * *